(12) United States Patent
Mekkittikul et al.

(10) Patent No.: US 6,947,998 B2
(45) Date of Patent: Sep. 20, 2005

(54) METHOD AND SYSTEM FOR BANDWIDTH ALLOCATION TRACKING IN A PACKET DATA NETWORK

(75) Inventors: Adisak Mekkittikul, Mtn.View, CA (US); Nader Vijeh, Sunnyvale, CA (US); William J. Tuohy, Sunnyvale, CA (US)

(73) Assignee: Broadband Royalty Corporation, Wilmington, DE (US)

( * ) Notice: Subject to any disclaimer, the term of this patent is extended or adjusted under 35 U.S.C. 154(b) by 705 days.

(21) Appl. No.: 10/094,035

(22) Filed: Mar. 7, 2002

(65) Prior Publication Data

US 2005/0013248 A1 Jan. 20, 2005

Related U.S. Application Data

(60) Provisional application No. 60/274,621, filed on Mar. 8, 2001.

(51) Int. Cl.[7] .................................... G06F 15/173
(52) U.S. Cl. ................. 709/241; 370/648; 370/477
(58) Field of Search ................ 709/240, 241, 709/242; 370/468, 477, 232, 233, 234, 235, 253

(56) References Cited

U.S. PATENT DOCUMENTS

| 5,828,878 | A | | 10/1998 | Bennett ........................ 395/672 |
|---|---|---|---|---|
| 5,905,730 | A | | 5/1999 | Yang et al. ................... 370/429 |
| 6,247,061 | B1 | * | 6/2001 | Douceur et al. ............. 709/240 |
| 6,327,254 | B1 | * | 12/2001 | Chuah ......................... 370/328 |
| 6,412,005 | B1 | * | 6/2002 | Bennett ........................ 709/226 |
| 6,563,829 | B1 | * | 5/2003 | Lyles et al. ............... 370/395.21 |
| 6,570,876 | B1 | * | 5/2003 | Aimoto ........................ 370/389 |

* cited by examiner

Primary Examiner—Krisna Lim
(74) Attorney, Agent, or Firm—Oblon, Spivak, McClelland, Maier & Neustadt, P.C.

(57) ABSTRACT

In a metropolitan area network, a method and system for maintaining an accurate total of the amount of allocated bandwidth on the network. A plurality of incoming packets are assigned to a respective plurality of queues of a metropolitan area network switch. Using a fair arbitration scheme, the respective queues are configured to empty at a specified output rate. A finish time for each respective queue is computed, the finish time describing a time at which the respective queue will be emptied using the output rate. The plurality of queues are grouped into multiple groups in accordance with their respective finish times. The earliest group includes the reserved rates of those queues having a finish time indicating an empty condition at a first time increment. The second earliest group includes the reserved rates of those queues having a finish time indicating an empty condition at a second time increment later than the first time increment, and so on. The amount of allocated bandwidth on the network is determined by tracking the sum of the reserved rates of all the multiple groups. The first time increment, second time increment, and the like are indexed with respect to a schedule clock. The earliest group thus indicates those queues that will have an empty condition at a next time increment of the schedule clock. The determination of the amount of allocated bandwidth can be accomplished in real time, thereby allowing the efficient allocation of unallocated bandwidth in real time.

19 Claims, 11 Drawing Sheets

↑ Continued on sheet 10/11 ↑

| Flow ID | Valid | X-OFF | Action | P_Ring | C_Ring | Dist. | SIM Fanout | M/U | Protection | BE Weight |
|---|---|---|---|---|---|---|---|---|---|---|
| 0 bit | 1 bit | 1 bit | 1 bit | 1 bit | 1 bit | 2 bits | 9 bits | 1 bit | 1 bit | 5 bits |
| 1 | 1 | No | Kill | R1 | | Transit | 000000000 | 0 | Guarantee | 0 |
| 2 | 1 | Yes | Pass | R2 | | receive | 100000000 | 0 | BE(STD) | 1 |
| 3 | 1 | | Pass | R2 | | Transit | 000000000 | 0 | | 0 |
| 4 | 1 | | Pass | R1 | | Insert | 000000001 | 0 | | 63 |
| 5 | 1 | | Pass | R1 | | copy | 100000000 | 1 | Guarantee | 0 |
| . . . | 0 | | | | | | | | | |
| 999999 | 1 | | | | | Insert | | | | 0 |

| Reserved rate | R Finish time | S Finish time | R_OR | S_OR | Reserve | Note |
|---|---|---|---|---|---|---|
| 14 bits | 32 bits | 32 bits | 1 bit | 1 bit | 4 bits | 8.4 sec @ 5ns clk |
| 10 Mbps | 435ABC | 435ABC | | | | Backlogged flow |
| 80 Mbps | NULL | NULL | | | | Non-Backlogged flow |
| NULL | NULL | NULL | | | | Unused entry |
| 1 Gbps | 3535DF | 3535DF | | | | Backlogged flow |
| 100 Mbps | | | | | | Pickup for Multicast |
| . | . | . | | | | . |
| . | . | . | | | | . |
| 8.5 Gbps | NULL | NULL | | | | Non-Backlogged flow |

↑ Continued from sheet 9 / 11 ↑

FIG. 8 (Continued)

METHOD AND SYSTEM FOR BANDWIDTH ALLOCATION TRACKING IN A PACKET DATA NETWORK

This application claims the benefit of earlier filed U.S. Provisional Application "A METHOD AND SYSTEM FOR BANDWIDTH ALLOCATION TRACKING IN AN ASYNCHRONOUS METRO PACKET TRANSPORT RING NETWORK", by Mekkittikul et al., Ser. No. 60/274,621, filed on Mar. 8, 2001.

FIELD OF THE INVENTION

The present invention relates to the field of packet data networks. More specifically, the present invention pertains a data flow control method and system for managing the data flow with respect to the available bandwidth in a metro packet transport ring network.

BACKGROUND ART

The Internet is a general purpose, public computer network which allows millions of computers all over the world, connected to the Internet, to communicate and exchange digital data with other computers also coupled to the Internet. As new technologies emerge, the speed at which one can connect onto the Internet is ever increasing. Now, users on the Internet have the bandwidth to participate in live discussions in chat rooms, play games in real-time, watch streaming video, listen to music, shop and trade on-line, etc. In the future, it is imagined that the bandwidth will be such that video-on-demand, HDTV, IP telephony, video teleconferencing, and other types of bandwidth intensive applications will soon be possible.

One approach by which bandwidth is being increased relates to fiber optics technology. By sending pulses of light through glass fibers no thicker than a human hair, vast amounts of digital data can be transmitted at extremely high speeds. And with the advent of dense wavelength division multiplexing, different wavelengths of light can be channeled over the same, single fiber strand, thereby increasing its capacity several fold.

However, there is a problem with distributing the bandwidth of this new fiber optic network to end users. As is well known, some applications are insensitive to bandwidth constraints, such as latency and dropped packets. For example, email applications and basic Web browsing are relatively time insensitive to latency and dropped packets. On the other hand, applications such as real time two way voice communication or video are very sensitive to time delays caused by latency and dropped packets. Acceptable performance of these applications is highly dependent upon the provision of a guaranteed minimum bandwidth.

Unfortunately, due to network traffic congestion, network availability, routing conditions, and other uncontrollable external factors, the provisioning of a guaranteed level of bandwidth availability for certain customers has proven problematic. In general, data packets vie for available bandwidth and are routed according to a best-effort delivery model. As such, the reliability of traditional packet switched data networks is at times sub-optimal. For example, in most cases, it is very difficult to provide any kind of quality of service (QoS) using traditional LAN switches and routers on IP networks. QoS refers to the guarantee of providing timely delivery of information, controlling bandwidth per user, and setting priorities for select traffic.

Different network traffic flows (or simply "flows") are respectively associated with different applications. A flow refers to the transmission of packets from a sender to a receiver to support an application, such as transferring a Web page, implementing a voice over IP conversation, playing a video, or the like. Some flows are described as real time flows since they require very low latency (e.g., a voice over IP application). Other flows are not so much latency dependent as they are consistent data transfer rate dependent (e.g., video over the Web). For real-time application flows such as video on demand, HDTV, voice communications, etc., dropped packets or late-arriving packets of the flows can seriously disrupt or even destroy performance. And for many Internet Service Providers (ISP's), Applications Service Providers (ASP's), web sites/portals, and businesses, it is of paramount importance that they have the ability to provide these flows with a certain minimum threshold bandwidth and/or latency. For example, an e-commerce or business web site may lose critical revenue from lost sales due to customers not being able to access their site during peak hours.

Because QoS is so highly desired by some users, there are mechanisms which have been developed to provide QoS functionality. One prior art method for implementing QoS is the use of various TDM (time division multiplexing) schemes. One widely used TDM scheme is the implementation of T-carrier services (e.g., T1 line for carrying data at 1.544 Mbits/sec. and T3 line for carrying data at a much faster rate of 274.176 Mbits/sec). These T1 and T3 lines are dedicated point-to-point datalinks leased out by the telephone companies. The telephone companies typically charge long distance rates (e.g., $1,500–$20,000 per month) for leasing out a plain old T1 line. Another commonly used TDM scheme for achieving QoS relates to Synchronous Optical Network (SONET). As with T-carrier services, SONET uses TDM to assign individual channels, or flows, to pre-determined time slots. With TDM, each channel is guaranteed its own specific time slot in which it can transmit its data. Although TDM enables QoS, it is costly to implement because both the transmitter and receiver must be synchronized at all times. The circuits and overhead associated with maintaining this precise synchronization is costly. Furthermore, TDM based networking technologies are inefficient with respect to unused time slots. If flows are inactive, their allocated bandwidth is wasted. In general, with TDM technologies, unused bandwidth from inactive flows is not reallocated to other users.

Another prior art method is the use of various forms of bandwidth reservations in conjunction with asynchronous schemes. Asynchronous data transmission schemes provide numerous advantages when compared to synchronous TDM type schemes, and as such, are generally overtaking synchronous technologies in both voice and data network installations (e.g., the IP based networks of the Internet). In implementing QoS, asynchronous schemes usually function by reserving a portion of their bandwidth for "high priority" latency sensitive flows. With most asynchronous schemes (e.g., Ethernet), QoS performance deteriorates with the increasing bandwidth utilization of the network. As the percentage of available bandwidth utilized by the network increases, the less efficient the prior art asynchronous QoS reservation schemes perform. Such schemes either maintain a large margin of unused bandwidth to ensure QoS, thereby virtually guaranteeing an under-utilization of available total bandwidth, or over-allocate bandwidth, leading to the abrupt dropping data for some users and/or ruining QoS for any high priority users.

Thus what is required is a solution that provides the advantages of asynchronous data networks while efficiently implementing QoS. What is required is a solution that enables the efficient allocation of available bandwidth, thereby allowing guaranteed QoS. The required solution should be able to allocate bandwidth to individual flows asynchronously without incurring the deteriorating performance of prior art asynchronous schemes with increasing scale (e.g., extremely large number of flows) and increasing network utilization. The required solution should be able to ensure a minimum amount of reserved bandwidth without incurring the wasted bandwidth problems of prior art TDM based networking schemes where bandwidth is wasted on inactive flows.

The required solution should be able to track individual flows on an individual basis, in order to ensure individual flows are not starved of bandwidth, while simultaneously ensuring bandwidth is not over-allocated to flows which do not require it. The required solution should be able to track when individual flows are active and when they are inactive, thereby allowing the bandwidth allocated to the inactive flows to be reassigned to those flows in need of it. The required solution should be capable of tracking total allocated bandwidth in real time, thereby allowing efficient allocation of unused bandwidth in real time while maintaining QoS. The real-time total allocated bandwidth tracking should allow the dynamic allocation of unused bandwidth in real-time. The present invention provides a novel solution to the above requirements.

SUMMARY OF THE INVENTION

The present invention comprises a method and system that provides the advantages of asynchronous data networks while efficiently implementing QoS. The present invention enables the efficient allocation of available bandwidth, thereby allowing guaranteed QoS. The present invention is able to track individual flows on an individual basis, in order to ensure individual flows are not starved of bandwidth, while simultaneously ensuring bandwidth is not over-allocated to flows which do not require it. The present invention can track when individual flows are active and when they are inactive, thereby allowing the bandwidth allocated to the inactive flows to be reassigned to those flows in need of it. The present invention can track total allocated bandwidth in real time, thereby allowing efficient allocation of unused bandwidth in real time while maintaining QoS. The real-time total allocated bandwidth tracking allows the dynamic allocation of unused bandwidth in real-time, while maintaining QoS.

In one embodiment, the present invention is a system for maintaining an accurate total of the amount of allocated bandwidth on the network, as implemented within a metropolitan area switch (MPS) that functions by allocating bandwidth of a metropolitan area network. Within the MPS, a plurality of incoming packets are assigned to a respective plurality of queues of the MPS. A finish time for each respective queue is computed, the finish time describing a time at which the respective queue will be emptied using the output rate. The plurality of queues are grouped into multiple groups in accordance with their respective finish times. These groups are referred to as "buckets" due to the fact that they include those queues having the same finish times.

The earliest group includes the reserved bandwidth of those queues having a finish time indicating an empty condition at a first time increment. The second earliest group includes the reserved bandwidth of those queues having a finish time indicating an empty condition at a second time increment later than the first time increment, and so on. Thus, for example, bucket 0 contains those queues which will be empty at the next time increment, bucket 1 contains those queues that will be empty at the next two time increments, and so on. The amount of allocated bandwidth on the network is determined by counting the reserved bandwidth of all active flows.

The first time increment, second time increment, and the like are indexed with respect to a schedule clock. One increment of the schedule clock comprises one complete round robin arbitration (e.g., per queue output onto the metropolitan area network) of all active queues within the MPS. The earliest group thus indicates those queues that will have an empty condition at a next time increment (e.g., output round) of the schedule clock. A new finish time is computed for each respective queue when a new packet is received by the respective queue. In this manner, the series of buckets are progressively "emptied" as the schedule clock progresses, and new buckets are filled as new queues receive new packets for transmission and new associated empty times. The queues that are empty at the next time increment indicate those flows that will be inactive at the next time increment. The bandwidth allocated to those flows can be reallocated. In this manner, the determination of the amount of allocated bandwidth can be accomplished in real time, thereby allowing the efficient allocation of unallocated bandwidth in real time while maintaining quality of service. The earliest bucket (e.g., bucket 0) shows the reserved rate of all queues which will be empty in the next time increment.

Thus, by grouping individual flows into buckets as described above, embodiments of the present invention can efficiently scale up to handle an extremely large number (e.g., 1 million or more) individual flows. The flows are assigned to buckets as described above on an individual basis. Their condition (active vs. inactive) is individually tracked in real-time, allowing their allocated bandwidth for inactive flows to be reallocated to active flows in real time. In so doing, the present invention enables the efficient allocation of available bandwidth, since the MPS is capable of tracking total allocated bandwidth in real time. This allows the efficient allocation of unused bandwidth in real time while maintaining QoS.

BRIEF DESCRIPTION OF THE DRAWINGS

The present invention is illustrated by way of example and not by way of limitation, in the figures of the accompanying drawings and in which like reference numerals refer to similar elements and in which:

FIG. 8 shows a flow information base (FIB) in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed to a method and system for maintaining an accurate total of the amount of allocated bandwidth on a network, as implemented within a metropolitan area switch (MPS). The present invention provides the advantages of asynchronous data networks while efficiently implementing QoS. The present invention enables the efficient allocation of available bandwidth, thereby allowing guaranteed QoS. The present invention is capable of tracking total allocated bandwidth in real time, thereby allowing efficient allocation of unused bandwidth in real time while maintaining QoS. The present invention and its benefits are further described below.

Figure 1:
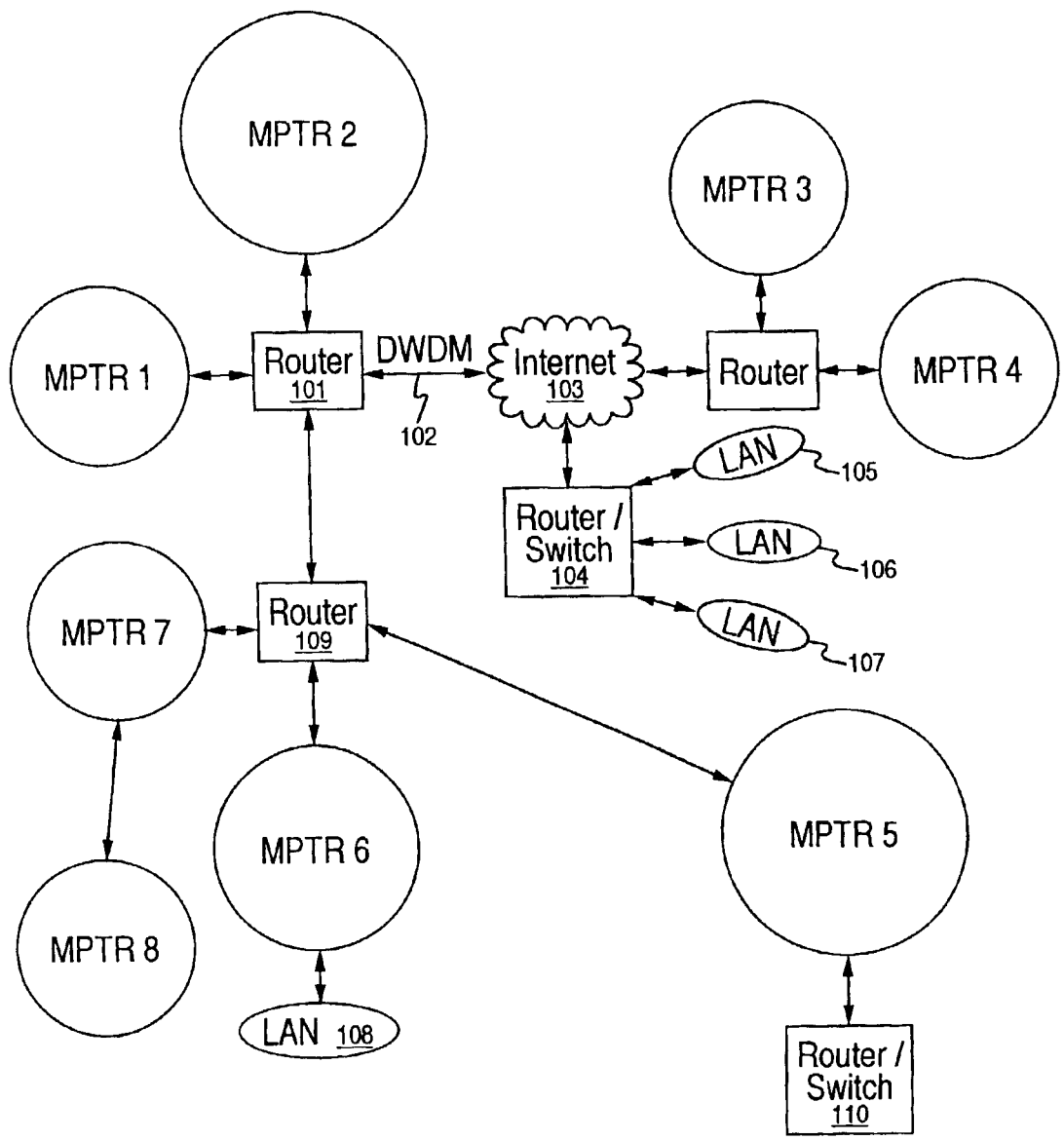
FIG. 1 shows the overall architecture of the asynchronous metro packet transport ring network according to the currently preferred embodiment of the present invention.

FIG. 1 shows an overall architecture of an asynchronous metro packet transport ring network in accordance with a currently preferred embodiment of the present invention. A metropolitan packet transport ring (MPTR) consists of a ring which is laid to transmit data packets in a metropolitan area network (MAN). A MAN is a backbone network which spans a geographical metropolitan area. Typically, telephone companies, cable companies, and other telecommunications providers supply MAN services to other companies, businesses, and users who need access to networks spanning public rights-of-way in metropolitan areas. In the currently preferred embodiment, the communications channel of the MPTR is implemented using a ring topology of installed fiber optic cables. Other less efficient transmission mediums such as hybrid fiber coax, coax cables, copper wiring, or even wireless (radio frequency or over-the-air laser beams) can be used or substituted in part thereof.

Users coupled to a particular MPTR can transmit and receive packetized data to/from each other through that MPTR. For example, a personal computer coupled to MPTR1 can transmit and received data packets to/from a server also coupled to MPTR1. Furthermore, data packets originating from one MPTR can be routed to another MPTR by means of a router. For example, a computer coupled to MPTR1 can transmit data packets over its fiber ring to a router 101 to MPTR2. The data packets can then be sent to its final destination (e.g., a computer coupled to MPTR2) through the fiber ring associated with MPTR2. It should be noted that the MPTR rings can be of various sizes and configurations. Although the currently preferred embodiment contemplates the use of a ring, the present invention can also utilize other types of topologies. The MPTRs can also be coupled onto the Internet backbone via a router. For example, MPTR1 can be coupled to a dense wavelength division multiplexed (DWDM) fiber backbone 102 by means of router 101. Thereby, users coupled to MPTR1 has access to the resources available on traditional Internet 103. Note that the present invention can be used in conjunction with traditional Internet schemes employing standard routers, switches, and other LAN equipment 104–107. And any number of MPTR's can thusly be coupled together to gracefully and cost-efficiently scale to meet the most stringent networking demands which may arise. And as one particular ring becomes overloaded, a second, third, forth, etc. MPTR may be added to accommodate the increased load. These MPTR's can be coupled to the same router (e.g., MPTR5, MPTR6, and MPTR7) or may alternatively be coupled to different routers.

Not only does the present architecture scale gracefully, it also offers great flexibility. In one embodiment, an MPTR can be used to support one or more LANs. For instance, MPTR6 may support traffic flowing to/from LAN 108. Optionally, it is conceivable that an MPTR may be coupled directly to another MPTR. In this manner, data flowing in MPTR8 can be directly exchanged with data packets flowing through MPTR7. Alternatively, a single MPTR can have multiple entries/exits. For example, MPTR5 is coupled to both router 109 as well as router/switch 110. Thereby, users on MPTR5 have the ability to transmit and receive data packets through either of the two routers 109 or 110. Virtually any configuration, protocol, medium, and topology is made possible with the present MPTR invention.

Figure 2:
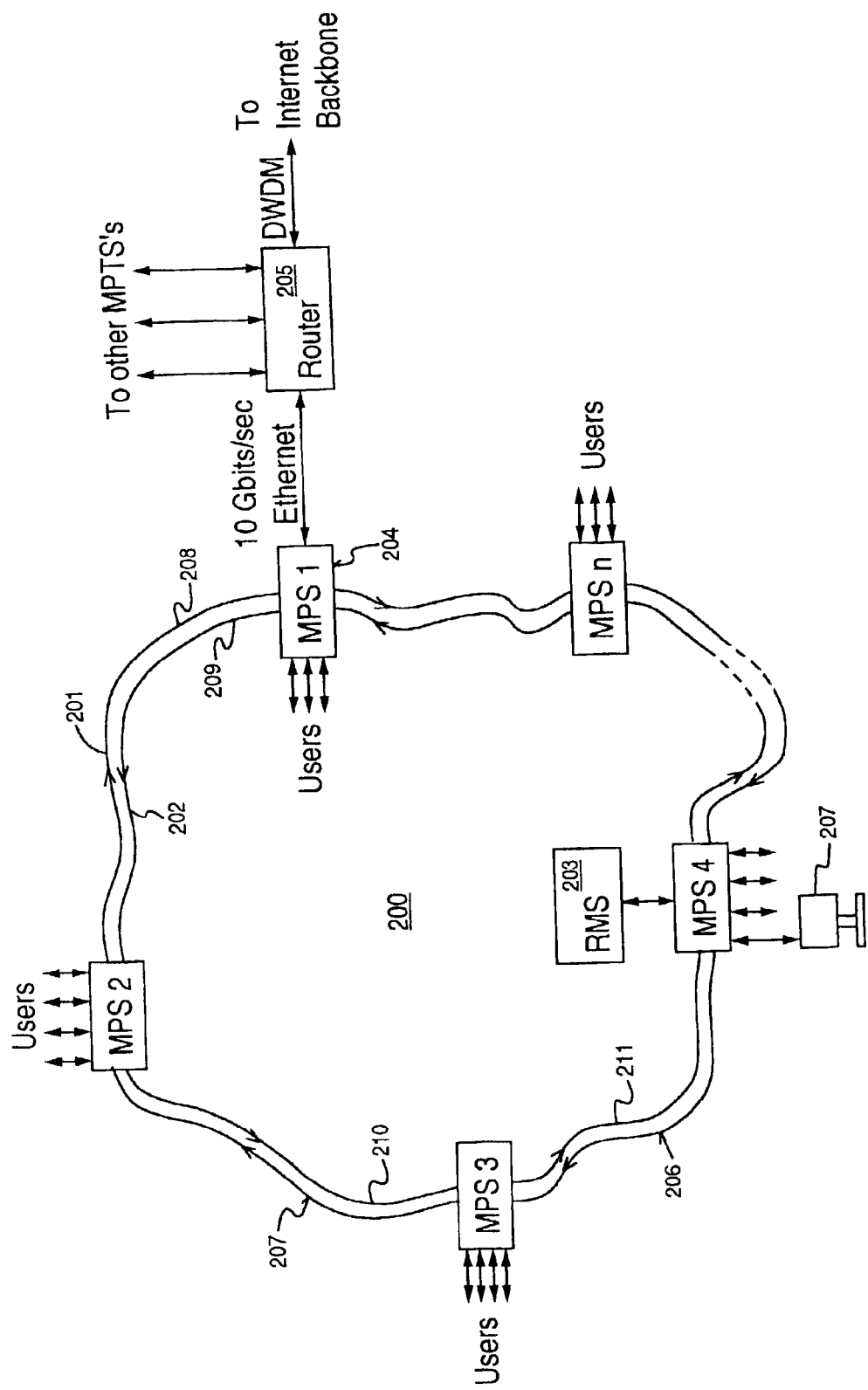
FIG. 2 shows an exemplary Metro Packet Transport Ring.

The implementation and functionality of an MPTR is now described. Referring to FIG. 2, an exemplary Metro Packet Transport Ring 200 is shown. It can be seen that MPTR 200 is comprised of two fiber cable rings, or rings, 201 and 202; a number of Metro Packet Switches (MPS1-MPSn); and a Ring Management System (RMS) 203. The physical layer of an MPTR is actually comprised of two redundant fiber cable rings 201 and 202. Data packets flow in opposite directions through the two rings (e.g., clockwise in ring 201 and counter-clockwise in ring 202). Dispersed along the fiber rings 201 and 202 are a number of Metro Packet Switches (MPS's). An MPS is coupled to both of the fiber rings 201 and 202. Thereby, if there is a break in one segment of the fiber ring, data can be redirected through one of the MPS's to flow through the other, operational fiber ring. Alternatively, traffic can be re-directed to minimize localized congestion occurring in either of the rings.

In the currently preferred embodiment, each MPTR can support up to 254 MPS's. An MPS is a piece of equipment which can be housed in specially designed environmental structures or it can be located in wiring closets or it can reside at a place of business, etc. The distances between MPS's can be variable. It is through an MPS that each individual end user gains access to the fiber rings 201 and 202. Each individual end user transmits packetized data onto the MPS first. The MPS then schedules how that packetized data is put on the fiber ring. Likewise, packetized data are first pulled off a fiber ring by the MPS before being sent to the recipient end user coupled to the MPS. In the currently preferred embodiment, a single MPS can support up to 128 end users. An end user can be added to an MPS by inserting a line interface card into that particular MPS. The line interface cards provide I/O ports through which data can be transferred between the MPS and its end users. Different line interface cards are designed in order to meet the particular protocol corresponding to that particular end user. Some of the protocols supported include T1, T3, SONET, Asynchronous Transfer Mode (ATM), digital subscriber line (DSL) Ethernet, etc. It should be noted that line interface cards can be designed to meet the specifications of future protocols. In this manner, end users such as mainframe computers, workstations, servers, personal computers, set-top boxes, terminals, digital appliances, TV consoles, routers, switches, hubs, and other computing/processing devices, can gain access to either of the fiber rings 201 and 202 through an MPS.

Not only does an MPS provide I/O ports to end users, but an MPS also provides a means for inputting packetized data into the MPTR and also for outputting packetized data out from the MPTR. For example, data packets are input to MPTR 200 via MPS 204 which is coupled to router 205. Similarly, data packets are output from MPTR 200 via MPS 204 to router 205.

Another function of an MPS entails passing along incoming data packets originating from an upstream MPS to the next downstream MPS. An MPS receives upstream data packets forwarded from an upstream MPS via an input fiber port coupled to the fiber ring. Data packets received from the fiber ring are examined by that MPS. If the data packet is destined for an end user coupled to that particular MPS, the data packet is routed to the appropriate I/O port. Otherwise, the MPS immediately forwards that data packet to the next downstream MPS as quickly as possible. The data packet is output from the MPS by an output fiber port onto the fiber ring. It should be noted that such pass-through packets flowing from an upstream fiber ring segment, through the MPS, and onto a downstream fiber ring segment, always takes priority over packets waiting to be inserted onto the fiber ring by the MPS. In other words, the MPS inserts data packets generated by its end users only as bandwidth permits.

An example is now offered to show how data packets flow in an MPTR. With reference to FIG. 2, a computer 207 coupled to MPS4 can transmit and receive data to/from the Internet as follows. Data packets generated by the computer are first transmitted to MPS4 via a line coupled to a line interface card residing within MPS4. These data packets are then sent on to MPS3 by MPS4 via ring segment 206. MPS3 examines the data packets and passes the data packets downstream to MPS2 via ring segment 207; MPS2 examines the data packets and passes the data packets downstream to MPS1 via ring segment 208. Based on the addresses contained in the data packets, MPS1 knows to output theses data packets on to the I/O port corresponding to router 205. It can be seen that MPS1 is connected to a router 205. Router 205 routes data packets to/from MPTR 200, other MPTR's, and the Internet backbone. In this case, the data packets are then routed over the Internet to their final destination. Similarly, data packets from the Internet are routed by router 205 to MPTR 200 via MPS1. The incoming data packets are then examined and forwarded from MPS1 to MPS2 via ring segment 209; examined and forwarded from MPS2 to MPS3 via ring segment 210; and examined and forwarded from MPS3 to MPS4 via ring segment 211. MPS4 examines these data packets and determines that they are destined for computer 207, whereby MPS4 outputs the data packets through its I/O port corresponding to computer 207.

Likewise, users coupled to any of the MPS's can transmit and receive packets from any other MPS on the same MPTR without having to leave the ring. For instance, a user on MPS2 can transmit data packets to a user on MPS4 by first transmitting the packets into MPS2; sending the packets from MPS2 to MPS3 over ring segment 207; MPS3 sending the packets to MPS4 over ring 202; and MPS4 outputting them on the appropriate port corresponding to the intended recipient.

Referring still to FIG. 2, it should be noted that the present invention solves the strict priority problems common to ring topology networks. The strict priority problem refers to the fact that upstream nodes (e.g., an upstream MPS) have larger amounts of available bandwidth in the communications channel in comparison to downstream nodes. For example, in the case of ring segment 210, MPS 2 is able to insert its local input flows (e.g., insertion traffic) onto segment 210 prior to MPS 3, and so on with MPS 3 and MPS 4 with ring segment 211. Hence, MPS 4, by virtue of its location within the ring topology, has less available bandwidth to insert its local input flow in comparison to MPS 3 and MPS 2.

To avoid strict priority problems, detailed information regarding the allocated bandwidth of the ring segments is required. Each MPS needs to be aware of the allocated bandwidth of the segments in order to make intelligent decisions regarding the allocation of any remaining unallocated bandwidth. Such information is even more important where bandwidth utilization is to be maximized in conjunction with guaranteed QoS. Preferably, bandwidth utilization information should be available on a "per-flow" basis should be sufficiently timely to allow intelligent allocation decisions to be made in real time.

Additional descriptions of the architecture of the MPTR, MPS, and RMS can be found in U.S. patent applications "GUARANTEED QUALITY OF SERVICE IN AN ASYNCHRONOUS METRO PACKET TRANSPORT RING", filed on Jun. 30, 2000, Ser. No. 09/608,747, assigned to the assignee of the present invention which is incorporated herein in its entirety, and "PER-FLOW CONTROL FOR AN ASYNCHRONOUS METRO PACKET TRANSPORT RING", filed on Jun. 30, 2000, Ser. No. 09/608,489, assigned to the assignee of the present invention which is incorporated herein in its entirety.

Figure 3:
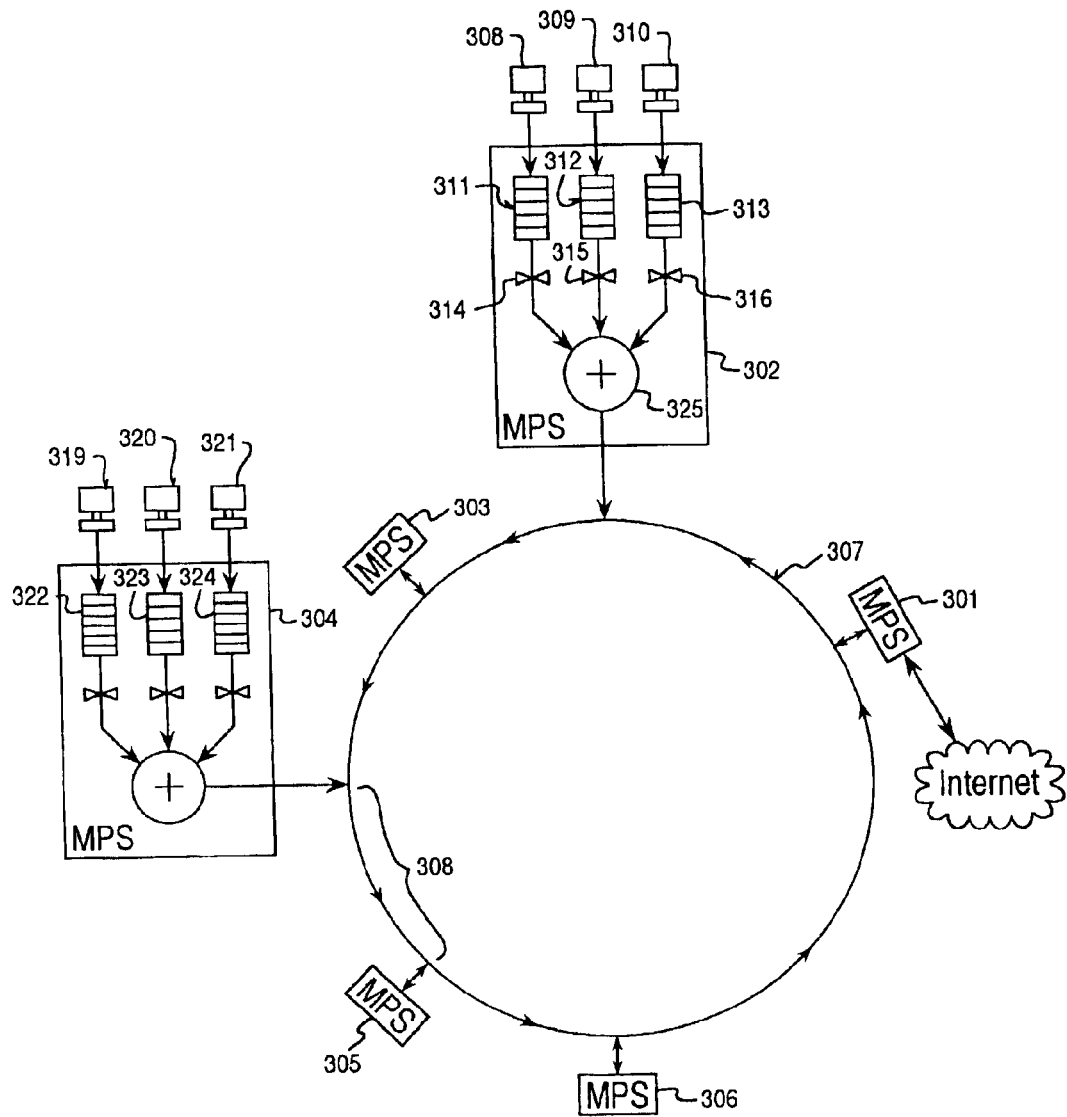
FIG. 3 shows an exemplary diagram of components of an MPTR.

FIG. 3 shows an exemplary diagram of components of an MPTR. A number of MPS's 301–306 are shown coupled to a fiber ring 307. Two of the MPS's 302 and 303 have been shown in greater detail to depict how data flows in an MPTR. A number of computers 308–310 are shown coupled to MPS 302. Each of these computers 308–310 has a corresponding buffer 311–313. These buffers 311–313 are used to temporarily store incoming data packets from their respective computers 308–310. Associated with each of these buffers 311–313 is a respective controller 314–316 which controls when packets queued in that particular buffer are allowed to be transmitted onto the ring 307. Once a packet is allowed to be transmitted out from MPS 302, it is inserted into an inserter 325 and added with the other outbound packets for that cycle. Once a packet is conveyed from an MPS onto ring 307, that packet is transmitted to its destination at the maximum rate of ring 307 and immediately forwarded through intermediary MPS's (if any).

In a preferred MPTR embodiment, fair bandwidth allocation is implemented using a per-flow bandwidth allocation concept. Traffic on the ring 307 is classified into flows. For example, all packets from one user belong to one flow. The granularity of flow can be fine (e.g., per-session) or coarse (e.g., per service port, etc.), and is generally specifiable by packet classification rules. Once packets are classified into a flow, each MPS can allocation bandwidth to each flow fairly and monitor that no flow exceeds the allocation.

The flow thus must be set up before the packets can be sent on the ring. Setting up flow involves specifying a number of parameters. Among these, the reserved bandwidth, $r_i$, and the allocation weight, $w_i$, are necessary for flow control, where "i" is the flow's unique identifier referred to as the flow ID. Once set up, a flow is recognized by its unique flow ID.

Figure 4:
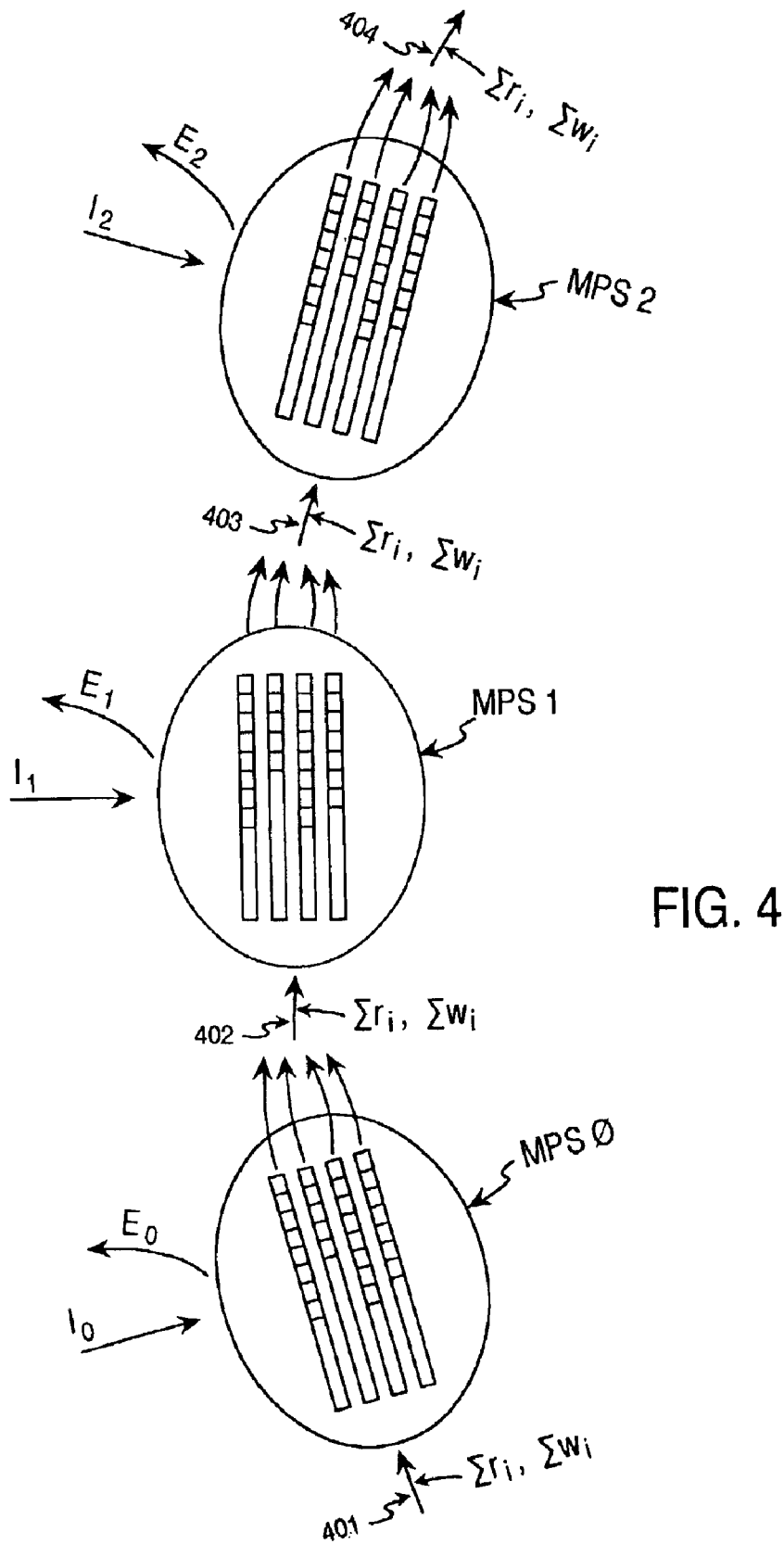
FIG. 4 a diagram of a set of MPS units and ring segments as implemented within an exemplary system in accordance with one embodiment of the present invention.

FIG. 4 shows a diagram showing three MPS units and their respective ring segments. As depicted in FIG. 4, three MPS units (MPS 0, MPS 1, and MPS 2) are shown with their respective ring segments 401–404. The MPS units are shown with their respective insertion traffic (I0, I1, and I2) and their respective exit traffic (E0, E1, and E2). Each MPS 0–2 is shown with a plurality of internal queues (four depicted within each MPS) used for tracking the flows.

As shown in FIG. 4, the queues of each MPS tracks the allocated bandwidth on each outgoing ring segment 401–404. As shown in FIG. 4, the traffic on the outgoing segment is represented as:

$$\sum_{active} r_i \text{ and } \sum_{active} w_i$$

The queues of each MPS track the data traffic belonging to each individual flow (described in greater detail below). The traffic on each segment takes into account the exit traffic of the previous MPS, the insertion traffic of the previous MPS, and the through traffic on the ring. The insertion traffic of each MPS is shown in FIG. 4 as "I" and the exit traffic of each MPS is shown as "E". The insertion traffic is the flows from the users coupled to the MPS that want to get onto the ring, for example, destined for users coupled to another MPS. The exit traffic is the flows destined for the users coupled to the MPS coming from other MPS units. The queues within each MPS are used to track the unique flows (e.g., having unique flow IDs) that are monitored and maintained by an MPS. Each of the queues tracking the outgoing flow for the outgoing ring segment are drained at a rate equal to the allocated bandwidth.

The queues are emptied at a rate affected by their respective weight, $w_i$. The weight of each queue allows the implementation of differing levels of bandwidth per queue. For example, where queues are of equal weight, the individual flow packets are routed from the queues at an equal rate. Once a packet is inserted onto an outbound ring segment, such as, for example, a packet from a flow of insertion traffic $I_0$ being inserted onto ring segment 402, that packet is added with other outbound packets and is transmitted along ring segment 402 at wire speed, or the maximum rate of transmission of the ring. The packet is immediately forwarded through intermediary MPS's (if any) as through traffic. Once a queue becomes empty, its bandwidth allocation becomes available for reassignment to other non-empty queues.

It should be noted that in a preferred embodiment, an MPS in accordance with the present invention maintains large sets of virtual queues (VQs) to monitor flow activity on all of its output links. Virtual queues function in a manner similar to the queues described above (e.g., the queues shown within the MPS units depicted in FIG. 4), however, they are implemented as counters which track the depth of the queues so that the data packets are not delayed as flow through their respective buffers. Additional descriptions of virtual queues as implemented in the preferred embodiment can be found in "PER-FLOW CONTROL FOR AN ASYNCHRONOUS METRO PACKET TRANSPORT RING", filed on Jun. 30, 2000, Ser. No. 09/008,489, assigned to the assignee of the present invention which is incorporated herein in its entirety. A VQ will have a finish time describing the time when all the packets are completely drained from the VQ at a flow allocated rate of $f_i$.

Figure 5:
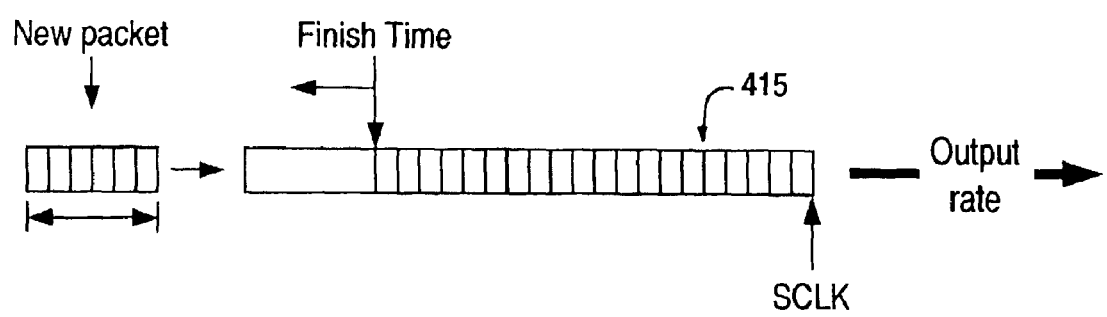
FIG. 5 shows a diagram of a queue of an MPS and its associated finish time.

FIG. 5 shows a diagram of a queue 415 and its associated finish time. The output rate of the queues 411–415 allows the determination of a "finish time" describing the time at which the respective queue will be emptied. This finish time provides a key measure of the total allocated bandwidth of the ring 450. Thus, as depicted in FIG. 5, queue 415 has a finish time that describes the time at which queue 415 will be emptied at its output rate. When a new packet arrives as shown, a new finish time is computed reflecting the new depth of the queue 415. Thus, as depicted in FIGS. 5 and 6, the MPS routes packets from the respective queues at a specified output rate, and a finish time for each respective queue is computed, the finish time describing a time at which the respective queue will be emptied using the allocated output rate (e.g., $f_i$ as defined below).

In this manner, each MPS maintains a large number of queues (e.g., up to 1 million or more), one for each flow at each link. Each queue grows at the rate of the traffic belonging to the flow, and is drained at a rate equal to the allocated bandwidth. Congestion is measured in the forms of: $\Sigma r_i$ and $\Sigma w_i$ of all non-empty (active) queues (e.g., queues 411–415). High values of $$\sum_{active} r_i \text{ and } \sum_{active} w_i$$

indicate that more flows are competing for the outgoing link bandwidth of the MPS. Each MPS frequently monitors the states of its queues to update these two parameters. Once detected, an MPS uses $$\sum_{active} r_i \text{ and } \sum_{active} w_i$$

to calculate bandwidth allocation for each flow.

In a preferred embodiment, each MPS calculates a fair allocation of bandwidth for all flows going through each of congestion points (e.g., at the outgoing ring segments). The allocation is calculated based on the following calculation:

$$f_i = r_1 + \frac{w_i(C - \sum r_i)}{\sum_{active} w_i},$$

where $f_i$ denotes the allocated bandwidth for flow i, and C is the link capacity of the congested point. Note that the term $$C - \sum_{active} r_i$$

is simply the unreserved bandwidth portion of the link that the MPS needs to reallocate fairly based on the reserved weights. This term is graphically depicted in FIG. 6B below.

For bandwidth efficiency, each MPS does not send out $f_i$ for every flow it sees. Instead, it sends a capacity reserved ratio (CRR) which generally describes the amount of unallocated bandwidth of the link. The CRR can then be used by each source within each MPS to calculate its own $f_i$ from its static database of $r_i$ and $w_i$. CRR is more formally defined as follows:

$$CRR = \frac{(C - \sum r_i)}{\sum_{active} w_i}$$

CRR is broadcasted to all other MPSs periodically to enable all MPSs to allocate unallocated link bandwidth. Each MPS can independently choose the frequency of the update. For each received CRR, each source uses the equation below to calculate its $f_i$.

$$f_i = r_i + w_i * CRR$$

Thus, in order to efficiently distribute unallocated link bandwidth, each MPS needs to track the total amount of allocated bandwidth and the total weight of the allocated bandwidth, $$\sum_{active} r_i \text{ and } \sum_{active} w_i.$$

In accordance with the present invention, these terms are tracked in real time and track flow activity at high speeds, as high as 10 Gbps per ring segment. The present invention uses the finish times of the respective queues and the assigned weights of the respective queues to implement a high speed tracking method for $$\sum_{active} r_i \text{ and } \sum_{active} w_i.$$

These techniques involve the uses of per-flow queues, a flow information base (FIB), a bucket information base (BIB), and a schedule clock. Using these terms, embodiments of the present invention can efficiently scale up to handle an extremely large number (e.g., 1 million or more) individual flows, while remaining within the capabilities of integrated circuit technology (e.g., can be implemented in an ASIC). The individual flows can be tracked in real-time, allowing their allocated bandwidth for inactive flows to be reallocated to active flows in real time.

Figure 6A:
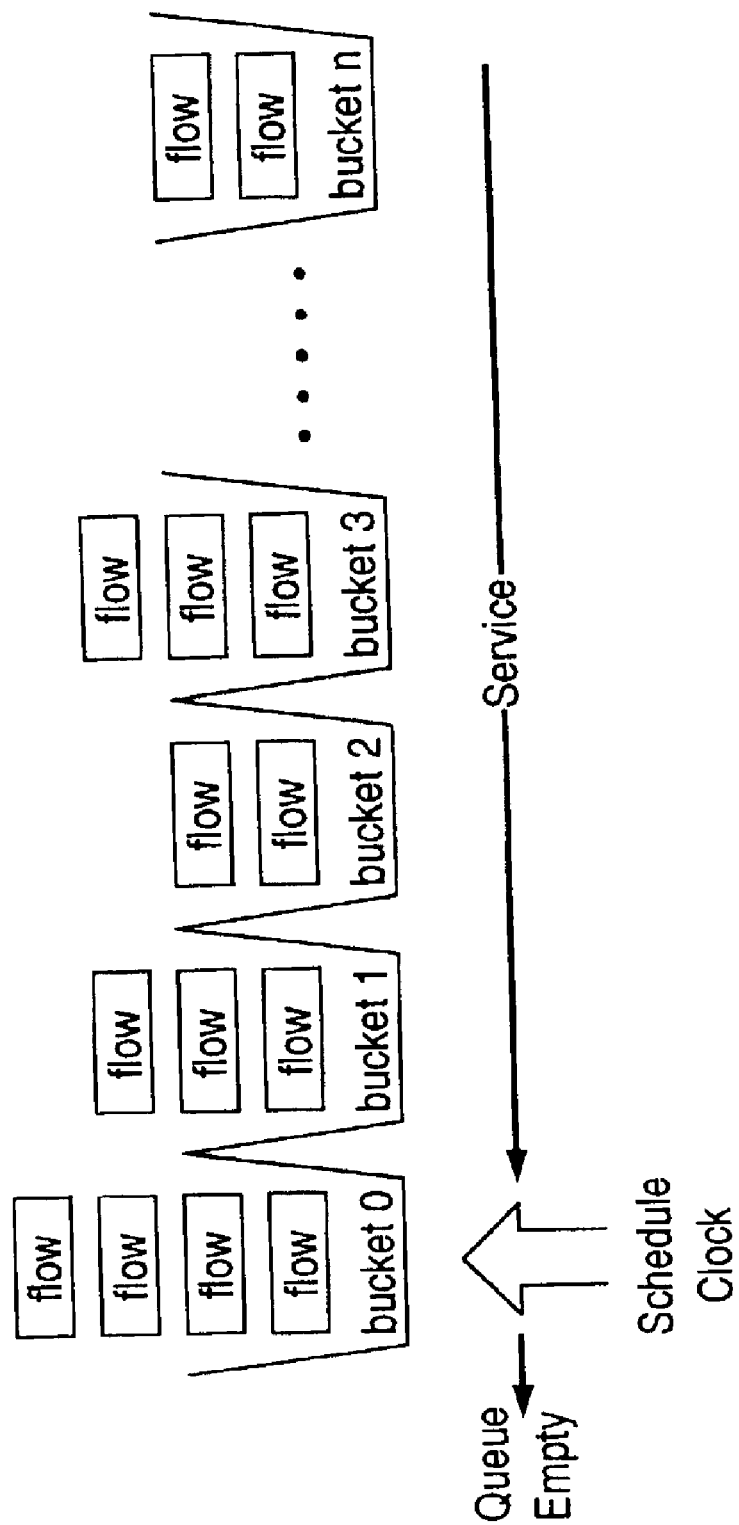
FIG. 6A shows a diagram depicting the multi-group queuing process in accordance with one embodiment of the present invention.

Referring now to FIG. 6A, a diagram depicting the multi-group queuing process of the present embodiment is shown. FIG. 6A depicts a plurality of flows sorted into a plurality of groups, shown as bucket 0, bucket 1, bucket 2, and so on, to bucket n. The plurality of queues are grouped into the multiple buckets, or groups, in accordance with their respective finish times. The finish times are indexed with respect to a schedule clock. The schedule clock, or global clock, provides the time reference for finish times. The value of schedule clock represents the current virtual time that finish times are compared to. Schedule clocks increment at a rate proportional to the congestion at a node, as described below. As depicted in FIG. 6A, as buckets are emptied, they move from right to left, as each bucket successively reaches the "queue empty" state shown on the left side FIG. 6A.

These groups of flows are referred to as "buckets" due to the fact that they include those queues having the same finish times with the schedule clock. For example, bucket 0 includes the reserved bandwidth and weight of those flows having a finish time corresponding to the next increment of the schedule clock, while bucket n includes the reserved bandwidth and weight of those flows having the longest finish time with respect to the schedule clock. Thus, the earliest bucket (e.g., bucket 0) includes those flows (e.g., queues) having a finish time indicating an empty condition at a first time increment, the second earliest bucket (e.g., bucket 1) includes those queues having a finish time indicating an empty condition at a second time increment later than the first time increment, and so on. Thus, for example, bucket 0 contains the reserved bandwidth and weight of those queues which will be empty at the next time increment of the schedule clock, bucket 1 contains those queues that will be empty at the next two time increments of the schedule clock, and so on, thereby indicating the amount of unallocated bandwidth that becomes available each time increment. The amount of allocated bandwidth on the network is determined by counting the total allocated bandwidth and total allocated weight of all the active flows (e.g., all bucket totals).

The time increments for the first bucket, the second bucket, and the like are indexed with respect to the schedule clock. One increment of the schedule clock comprises one complete round robin arbitration (e.g., per queue output onto the metropolitan area network) of all active queues within the MPS, in the manner described in FIG. 4 above. Inactive, or empty, queues do not contribute to the schedule clock period. The bucket 0 thus indicates those flows that will have an empty condition at a next time increment (e.g., output round) of the schedule clock. As described above, a new finish time is computed for each respective queue, and thus for each flow, when a new packet is received by the respective queue. In this manner, the series of buckets are progressively "emptied" as the schedule clock progresses, and new buckets are filled as new queues receive new packets for transmission and new associated empty times, and the buckets progress from right to left as depicted in FIG. 6A.

Referring still to FIG. 6A, when the schedule clock advances to the finish time of a bucket, the flows within the bucket, and thus their queues, are regarded as completely serviced, and therefore, empty. Those flows are considered inactive with respect to the link when their queues are empty.

The schedule clock advances by one every time interval, T_Sclk, given below:

$$T\_Sclk = \frac{\sum r_i + CRR * \sum w_i}{C}$$

The schedule clock (represented as SCLK) advances independently based on the flow activity on the corresponding link. It should be noted that the SCLK does not necessarily advance at a constant rate as a conventional clock. $\Sigma r_i + CRR * \Sigma w_I$ divided by the link capacity C, represents the percentage of link usage at current CRR values. The higher value of $$\sum_{active} r_i,$$

the slower the SCLK advances. The difference between the finish time of a queue and the schedule clock represents the degree of backlog of the queue in terms of the amount of time to empty the queue (empty time).

$$T_{empty} = T_{finish} - T_{SCLK}$$

In addition to determining whether flows are active or inactive, the schedule clock can also be used to pace flows to determine whether any of them have exceeded their respective allocated bandwidths. This can be done by ensuring $T_{empty}$ does not get too large.

Referring still to FIG. 6A, being able to quickly determine which VQs become empty simplifies the calculation of $$\sum_{active} r_i \text{ and } \sum_{active} w_i.$$

This is due to the fact that the calculation can be done incrementally. Given the old values, the new values can be calculated in one step as follows:

$$\sum_{active} r_i = \sum_{active} r_i - \sum_{\substack{expired \\ bucket}} r_i$$

$$\sum_{active} w_i = \sum_{active} w_i - \sum_{\substack{expired \\ bucket}} w_i$$

$$\sum_{\substack{expired \\ bucket}} w_i$$

is also a term that can be computed incrementally.

When a flow moves from one bucket to another, its $r_i$ and $w_i$ are subtracted from the sums of the old bucket and added to that on the new buckets. For a flow that comes back from a previously inactive (empty) state, its $r_i$ and $w_i$ should be add to $$\sum_{active} r_i \text{ and } \sum_{active} w_i$$

too.

Figure 6B:
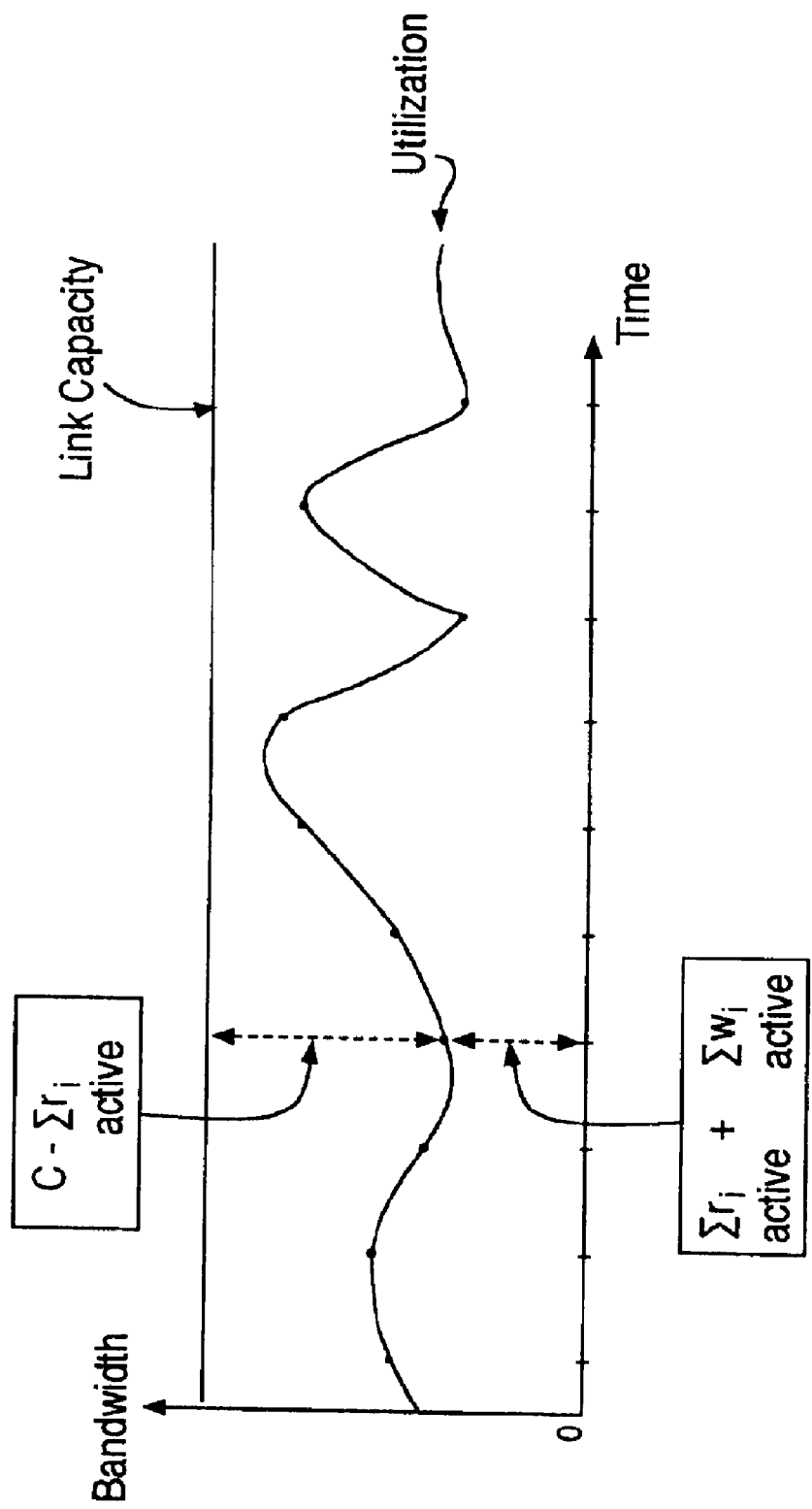
FIG. 6B graphically depicts the summation of all $r_i$ and $w_i$ in accordance with one embodiment of the present invention.

FIG. 6B graphically depicts the summation of all ri and wi in accordance with one embodiment of the present invention. As shown in FIG. 6B, the vertical axis is bandwidth and the horizontal axis is time. The link capacity is as shown. The trace shows the utilization of the link capacity as it changes over time (e.g., as some flows become active and other flows become inactive).

Figure 7:
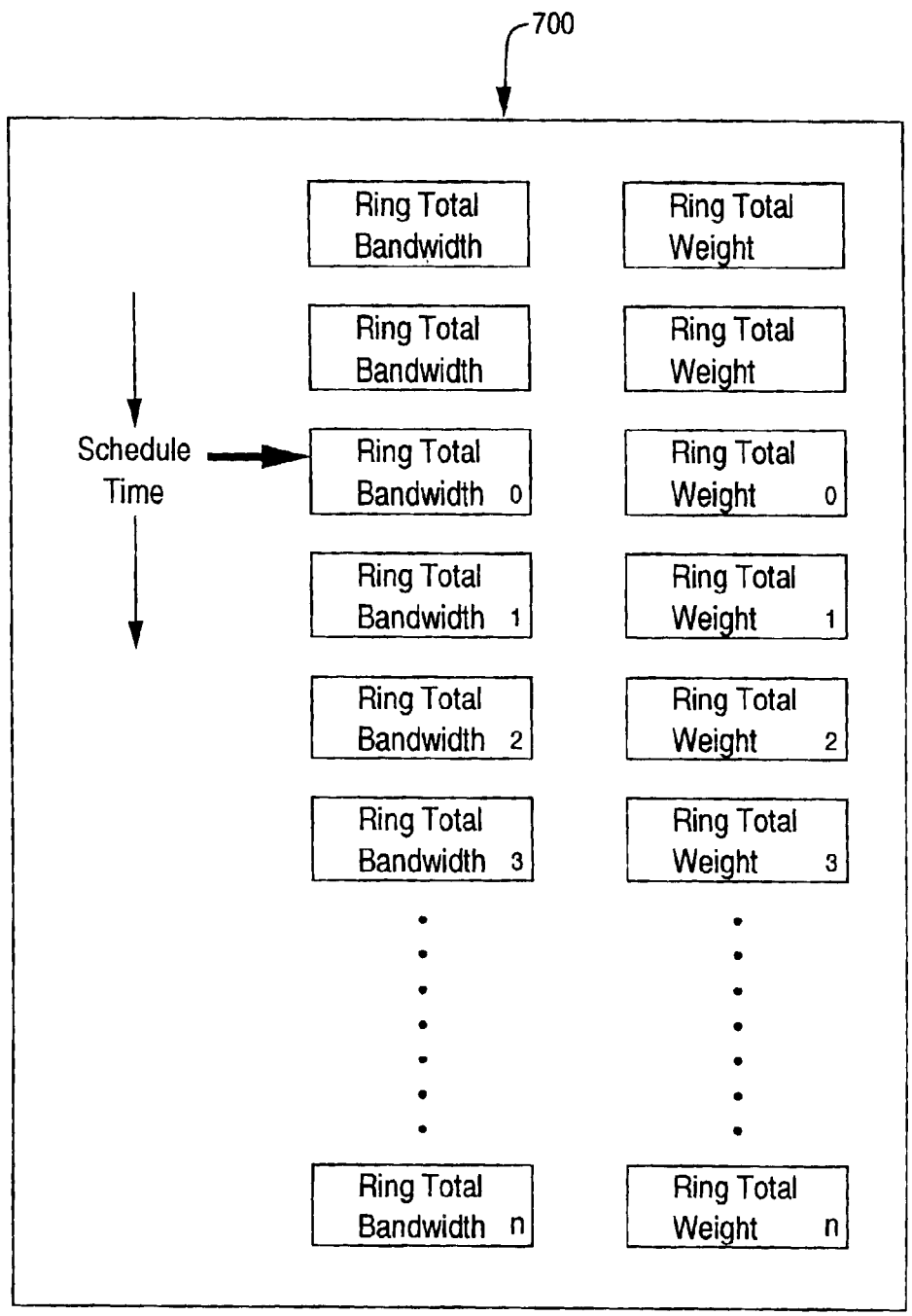
FIG. 7 shows a diagram of a bucket information base (BIB) in accordance with one embodiment of the present invention.

Referring now to FIG. 7, a diagram of a bucket information base (BIB) 700 in accordance with one embodiment of the present invention is shown. The buckets depicted in FIG. 6A are implemented as a series of counters within a database, the BIB 700, maintained within each MPS. As depicted in FIG. 7, each bucket is implemented as a ring total bandwidth counter and a corresponding ring total weight counter. The counters are incremented to reflect the number of flows, and their associated weights, within the bucket. The schedule clock functions as a pointer that cycle through the counters in accordance with the time increment at which their respective flows will be empty, in the manner described above. Thus, for example, at the next time increment, the schedule time pointer will move to indicate the counters associated with bucket 1, and so on. In a preferred embodiment, BIB 700 is organized as a two column and 8K long table as shown FIG. 7. BIB 700 is able to sustain 16 accesses for every 50 ns, thereby allowing updates when, for example, new packets arrive within the queues.

FIG. 8 shows a flow information base (FIB) 800 in accordance with one embodiment of the present invention. An MPS uses the FIB 800 as a flow descriptor. The FIB 800 contains fields specifying various actions to be applied to the packets belonging to each flow (transit forward on the ring, exit the ring to a specifc port, etc.) and fields holding flow parameters, such as $r_i$ and $w_i$. The finish time of a flow, which tracks its virtual queue depth, is stored in the FIB. When packets arrive, the finish time in the FIB is updated, and used to access the BIB as described above. Thus the FIB is only accessed as packets arrive.

Figure 9:
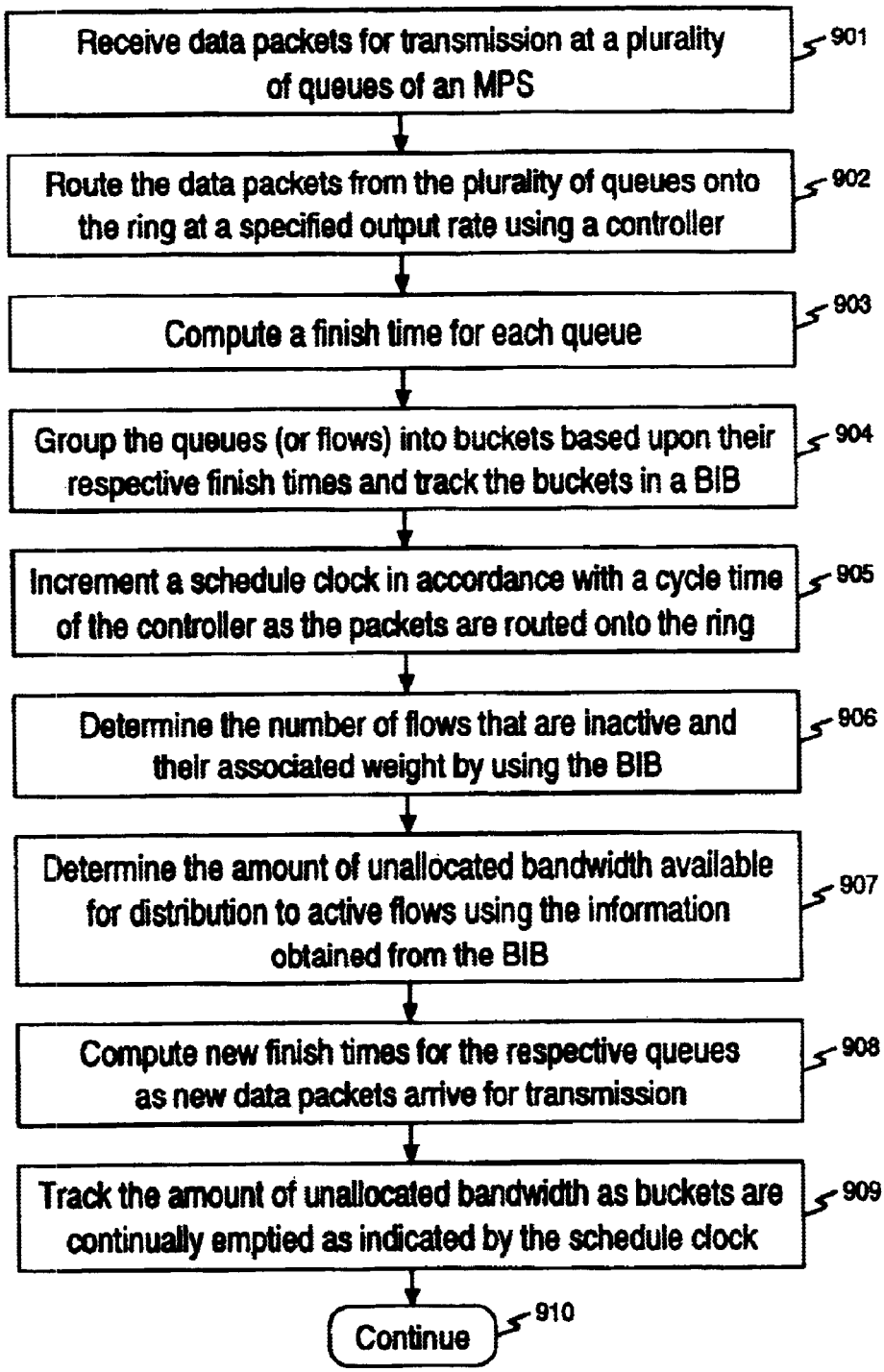
FIG. 9 shows a flow chart of the steps of a bandwidth tracking and allocation process in accordance with one embodiment of the present invention.

FIG. 9 shows a flow chart of the steps of an operating process 900 in accordance with one embodiment of the present invention. As depicted in FIG. 9, process 900 shows the operating steps of an MPS maintaining an accurate total of the amount of allocated bandwidth on the network, as implemented within an MPTR.

Process 900 begins in step 901, where data packets for transmission are received from a plurality of users by the queues of an MPS. Within the MPS, the plurality of incoming packets from the various users are assigned to a respective plurality of queues of the MPS.

In step 902, data from the queues is routed onto the ring. Using a fair arbitration scheme (e.g., round robin, etc.), a controller is configured to empty the respective queues at a specified output rate.

In step 903, a finish time is computed for each respect queue. The finish time describes the time at which the respective queue will be emptied using the current output rate.

In step 904, the queues are grouped into respective buckets based on their respective finish times. To facilitate high-speed tracking, the plurality of queues are grouped into multiple buckets, or groups, in accordance with their respective finish times. These groups are referred to as "buckets" due to the fact that they include those queues having the same finish times. As described above, the buckets can be implemented using respective counter pairs within a database, the counter pairs configured to track the total reserved $r_i$ having the same finish times and their respective weights.

In step 905, a schedule clock is incremented in accordance with the cycle time of the controller. As described above, a higher number of active flows leads to a slower increment rate of the schedule clock, and vice versa. The finish times are indexed with respect to the schedule clock. The earliest bucket includes those queues having a finish time indicating an empty condition at a first time increment, the second earliest bucket includes those queues having a finish time indicating an empty condition at a second time increment later than the first time increment, and so on.

In step 906, the total $r_i$ of flows becoming inactive and their associated weight are determined using the buckets. As described above, counter pairs configured to track the reserved bandwidth of queues having the same finish times and their respective weights can be used to determine the allocated bandwidth of flows and their associated weights becoming inactive on the next schedule clock increment.

In step 907, determine the amount of unallocated bandwidth based upon information obtained in step 906. As described above, the amount of allocated bandwidth on the network is determined by counting $$\sum_{active} r_i \text{ and } \sum_{active} w_i.$$

This information allows the MPS to accurately determine an amount of unallocated bandwidth available for distribution to the active flows.

In step 908, new finish times are computed for the active flows as new data arrives at the queues for transmission.

Subsequently, in step 909, process 900 continues by repeating steps 904–909. In this manner, the series of buckets are progressively "emptied" as the schedule clock progresses, and new buckets are filled as new queues receive new packets for transmission and new associated empty times.

Thus, the determination of the amount of allocated bandwidth can be accomplished in real time, thereby allowing the efficient allocation of unallocated bandwidth in real time while maintaining quality of service. The earliest bucket (e.g., bucket 0) shows all queues which will be empty in the next time increment. In so doing, the present invention enables the efficient allocation of available bandwidth, since the MPS is capable of tracking total allocated bandwidth in real time. This allows the efficient allocation of unused bandwidth in real time while maintaining QoS.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the Claims appended hereto and their equivalents.

What is claimed is:

1. In a packet data network, a method for maintaining an accurate total of the amount of allocated bandwidth on the network, the method comprising the steps of:
    a) assigning a plurality of incoming packets to a respective plurality of queues, the respective queues configured to empty at an output rate
    b) computing a finish time for each respective queue, the finish time describing a time at which the respective queue will be emptied using the output rate
    c) grouping the plurality of queues into at least a first group and a second group, wherein the first group includes those queues having a finish time indicating an empty condition at a first time increment and the second group includes those queues having a finish time indicating an empty condition at a second time increment later than the first time increment; and
    d) determining the amount of allocated bandwidth by totaling number of queues in the first group and the second group.

2. The method of claim 1 wherein a respective weight is associated with each of the plurality of queues and an allocated weight for the amount of allocated bandwidth is determined by totaling the respective weights of the queues in the first group and the second group.

3. The method of claim 1 wherein the first time increment and the second time increment are indexed with respect to a schedule clock and the first group indicates those queues that will have an empty condition at a next increment of the schedule clock.

4. The method of claim 3 wherein the schedule clock is incremented in accordance with a relative amount of congestion measured at a node.

5. The method of claim 1 wherein the totaling from step d) is maintained in a database with corresponding weights for the number of queues.

6. The method of claim 1 wherein a new finish time is computed for each respective queue when a new packet is received by the respective queue.

7. The method of claim 1 wherein the amount of allocated bandwidth is determined in real time.

8. The method of claim 1 wherein the amount of allocated bandwidth is used to determine an amount of unallocated bandwidth, thereby allowing the allocation of the unallocated bandwidth while maintaining a quality of service of the allocated bandwidth.

9. A system for distributing bandwidth in a packet data network while maintaining an accurate total of the amount of allocated bandwidth on the network, comprising:
    a respective plurality of queues configured to receive a respective plurality of incoming packets of data flows, the queues included in an MPS (metro packet switch) coupled to the network;
    a schedule clock configured to increment in relation to a measured congestion at a link; and
    a database for grouping the plurality of queues into at least a first group and a second group, wherein the first group includes those queues having a finish time indicating an empty condition at a first time increment of the schedule clock and the second group includes those queues having a finish time indicating an empty condition at a second time increment of the schedule clock later than the first time increment, the MPS configured to determine the amount of allocated bandwidth by totaling the number of queues in the first group and the second group.

10. The system of claim 9 wherein a respective weight is associated with each of the plurality of queues and an allocated weight for the amount of allocated bandwidth is determined by totaling the respective allocated weights of the queues in the first group and the second group.

11. The system of claim 9 wherein a result the totaling of the queues is maintained in the database with corresponding weights for the queues.

12. The system of claim 9 wherein a new finish time is computed for each respective queue when a new packet is received by the respective queue.

13. The system of claim 9 wherein the amount of allocated bandwidth is determined in real time.

14. The system of claim 9 wherein the amount of allocated bandwidth is used to determine an amount of unallocated bandwidth, thereby allowing the allocation of the unallocated bandwidth while maintaining a quality of service of the allocated bandwidth.

15. The system of claim 9 wherein the amount of unallocated bandwidth is described as a single term, and the term is broadcast to a plurality of other nodes so that the other nodes can shape their input traffic.

16. The system of claim 9 wherein the database is implemented using pairs of counters for each group, each pair having a first counter for the number of queues within the group and a second counter for the respective weights of the queues with the group.

17. The system of claim 9 wherein the queues are virtual queues, wherein each of the virtual queues keeps track of a backlog of a corresponding data flow without physically buffering the data flow.

18. The system of claim 9 wherein the network is a ring topology metropolitan area network.

19. The system of claim 18 wherein the ring topology metropolitan area network comprises an Ethernet communications channel.

* * * * *